(12) United States Patent
Chakra et al.

(10) Patent No.: US 9,185,065 B2
(45) Date of Patent: Nov. 10, 2015

(54) COMPUTER METHOD AND SYSTEM FOR ATTACHMENT REDUCTION

(75) Inventors: Al Chakra, Apex, NC (US); Liam Harpur, Dublin (IE); Mark Kelly, Dublin (IE); John Rice, Waterford (IE)

(73) Assignee: International Business Machines Corporation, Armonk, NY (US)

( * ) Notice: Subject to any disclaimer, the term of this patent is extended or adjusted under 35 U.S.C. 154(b) by 797 days.

(21) Appl. No.: 12/940,630

(22) Filed: Nov. 5, 2010

(65) Prior Publication Data
US 2012/0117159 A1    May 10, 2012

(51) Int. Cl.
G06F 15/16 (2006.01)
H04L 12/58 (2006.01)
G06Q 10/10 (2012.01)

(52) U.S. Cl.
CPC .............. H04L 51/08 (2013.01); G06Q 10/107 (2013.01)

(58) Field of Classification Search
CPC .............................. H04L 51/08; G06Q 10/107
USPC .................................................. 709/206, 204
See application file for complete search history.

(56) References Cited

U.S. PATENT DOCUMENTS

| | | | |
|---|---|---|---|
| 7,155,482 B2 | 12/2006 | Shinohara et al. | |
| 7,454,471 B2 | 11/2008 | Sorgc et al. | |
| 2003/0182323 A1* | 9/2003 | Demsky et al. | 707/203 |
| 2007/0094605 A1 | 4/2007 | Dietz et al. | |
| 2007/0288859 A1* | 12/2007 | Vuong et al. | 715/770 |
| 2011/0025842 A1* | 2/2011 | King et al. | 348/135 |

* cited by examiner

*Primary Examiner* — Dustin Nguyen
*Assistant Examiner* — Joel Mesa
(74) *Attorney, Agent, or Firm* — Holland & Knight LLP; Brian J. Colandreo, Esq.; Jeffrey T. Placker, Esq.

(57) ABSTRACT

Computer method, apparatus and system reduces size of attachments for an electronic communication. The method/system automatically selects a part (portion) of a working document to serve as the electronic communication attachment or upload. A monitoring unit monitors sender-user activity with respect to the working document and logs indications of the portions of the working document that are read by the user. During email composition, an attachment engine automatically selects the logged and indicated document portions to serve as an attachment reduced in size. During other electronic communication composition, such as to a blog, wiki or computer network forum, the attachment engine automatically selects the logged and indicated document portions to serve as the upload reduced in size.

20 Claims, 4 Drawing Sheets

COMPUTER METHOD AND SYSTEM FOR ATTACHMENT REDUCTION

BACKGROUND

The present invention relates to reducing energy consumption and making authors of electronic communications more efficient and to reduce leakage of confidential information.

Computer users routinely use messaging and collaboration systems as a method to share information and documentation with others. The problem with email systems is that a lot of the time the information contained in one email message is excessive to that which is sufficient and uses up valuable bandwidth and disc space.

Take for example, a sender-user sending a 5 mb PDF document by email to another user (i.e., the receiver-user). In this document there are only 3 pages of "importance" that will be read by the receiver-user, which means roughly 90% of the bandwidth and diskspace used to transport and process this email is wasted. This has a measurable impact on mail servers (running longer, processing many attachments) and the full documents may contain sensitive information that was inadvertently sent.

Thus, there exists a need for improved electronic communication systems and methods to share information and documentation with others.

BRIEF SUMMARY

The present invention addresses the above shortcomings and problems of the prior art. Generally, the present invention provides computer methods and systems that help in combating the above described waste in bandwidth, disc space and mail server processing by minimizing outgoing attachments and uploads to contain only the information "previously" read by the sender.

Computer implemented method/system/apparatus of the present invention reduce the size of electronic communication attachments, such as but not limited to email attachments and uploads to blogs, wikis and forums to name a few. Embodiments employ: a monitoring unit and an attachment engine. The monitoring unit monitors user actions (e.g., viewing actions) relative to a working document. The monitoring unit records (logs) in a log indications of monitored user viewing action per working document. This logging/recording includes indicating in the log one or more certain portions of the working document that have been substantially viewed (i.e., read or otherwise focused on) by the user.

In response to the user composing an email message (or electronic communication generically speaking), the attachment engine selects the one or more certain portions of the working document to serve as an attachment to the email message or as an upload to a blog, a wiki or forum (e.g., computer network forum). This is accomplished by the attachment engine automatically providing, based on the log, the indicated one or more certain portions of the working documents. Said selecting and providing by the attachment engine enables the user to employ the one or more certain portions of the working document instead of the whole working document as the attachment to the email message or upload. As a consequence, a reduced in size email attachment/upload attachment results.

According to one embodiment of the present invention, the monitoring and logging of user viewing actions is done in a background process free of the user defining the certain portion(s). The monitored viewing actions do not involve the user defining the certain portions or making preselections (e.g., preselected text, keywords, etc.) about the certain portions for electronic communication. Further, the invention system/attachment engine automatically provides, based on log indications, the certain portion(s). The user does not preselect or indicate these portions. Instead, the user viewing actions as previously monitored and logged provide the indication of the relevant parts of the working document.

In one embodiment, the step of monitoring user viewing action monitors user action with respect to a threshold amount of time. In particular, where the user action is a pausing on the certain portion of the working document for the threshold amount of time, said pausing is deemed indicative of the user reading the certain portion of the working document.

In one embodiment, each certain portion may be formed of one or more different segments of the working document. The working document may be any of a word processed document, image, text document, web page, HTML document and/or other document.

Advantageously in email application embodiments, the reduced in size email attachment allows reduced email server processing. In addition, the reduced in size email attachment further enables reduced email server memory storage used to store email attachments.

In another embodiment, the method further provides to the user a choice of using the whole working document as the email/upload attachment instead of one or more of the certain portions.

In other embodiments, the step of monitoring includes utilizing a web cam, sensor, or other such device view of user actions relative to the working document.

BRIEF DESCRIPTION OF THE SEVERAL VIEWS OF THE DRAWINGS

The foregoing will be apparent from the following more particular description of example embodiments of the invention, as illustrated in the accompanying drawings in which like reference characters refer to the same parts throughout the different views. The drawings are not necessarily to scale, emphasis instead being placed upon illustrating embodiments of the present invention.

DETAILED DESCRIPTION

Figure 1:
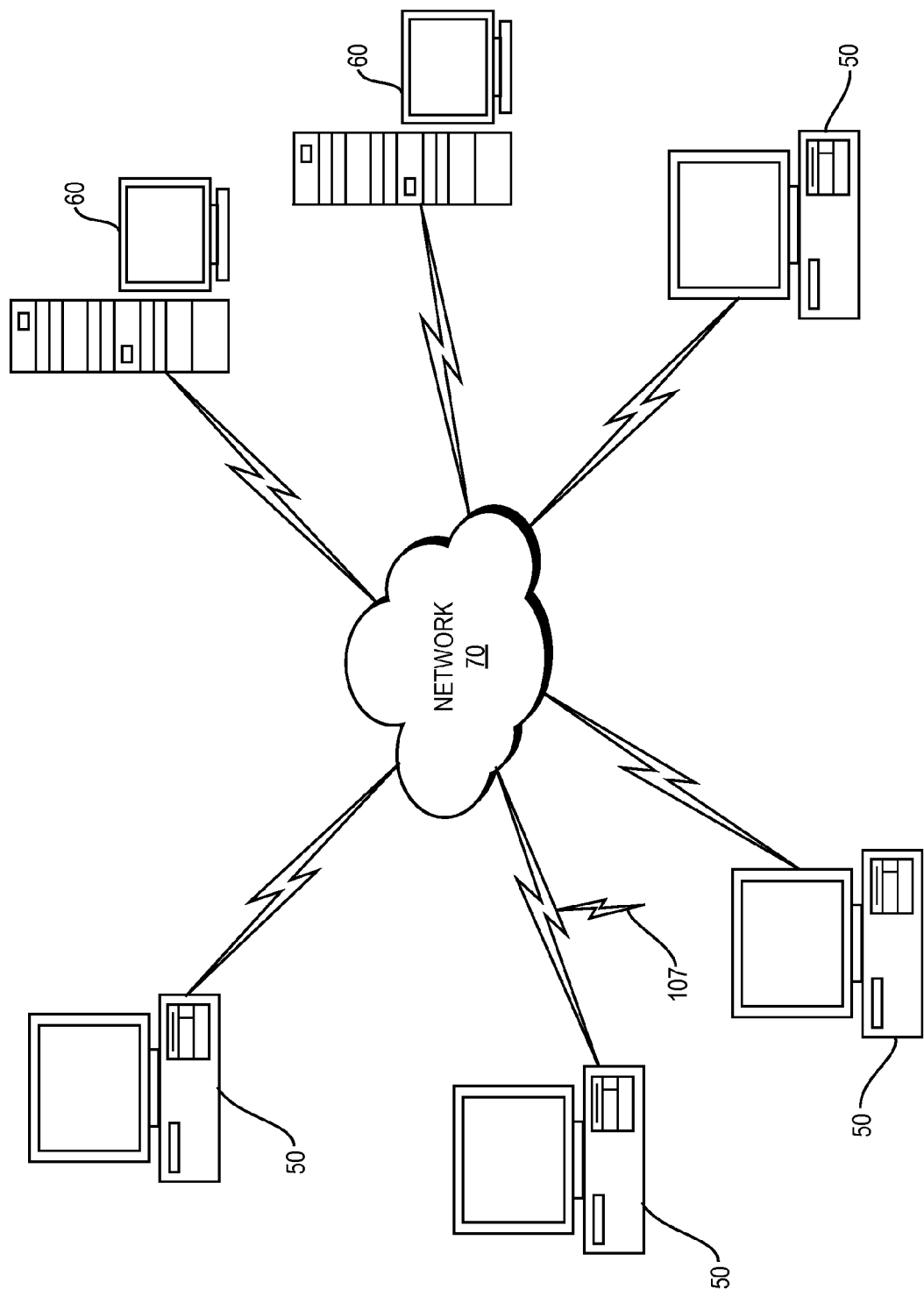
FIG. 1 is a computer network environment in which embodiments of the present invention are deployed.
Figure 2:
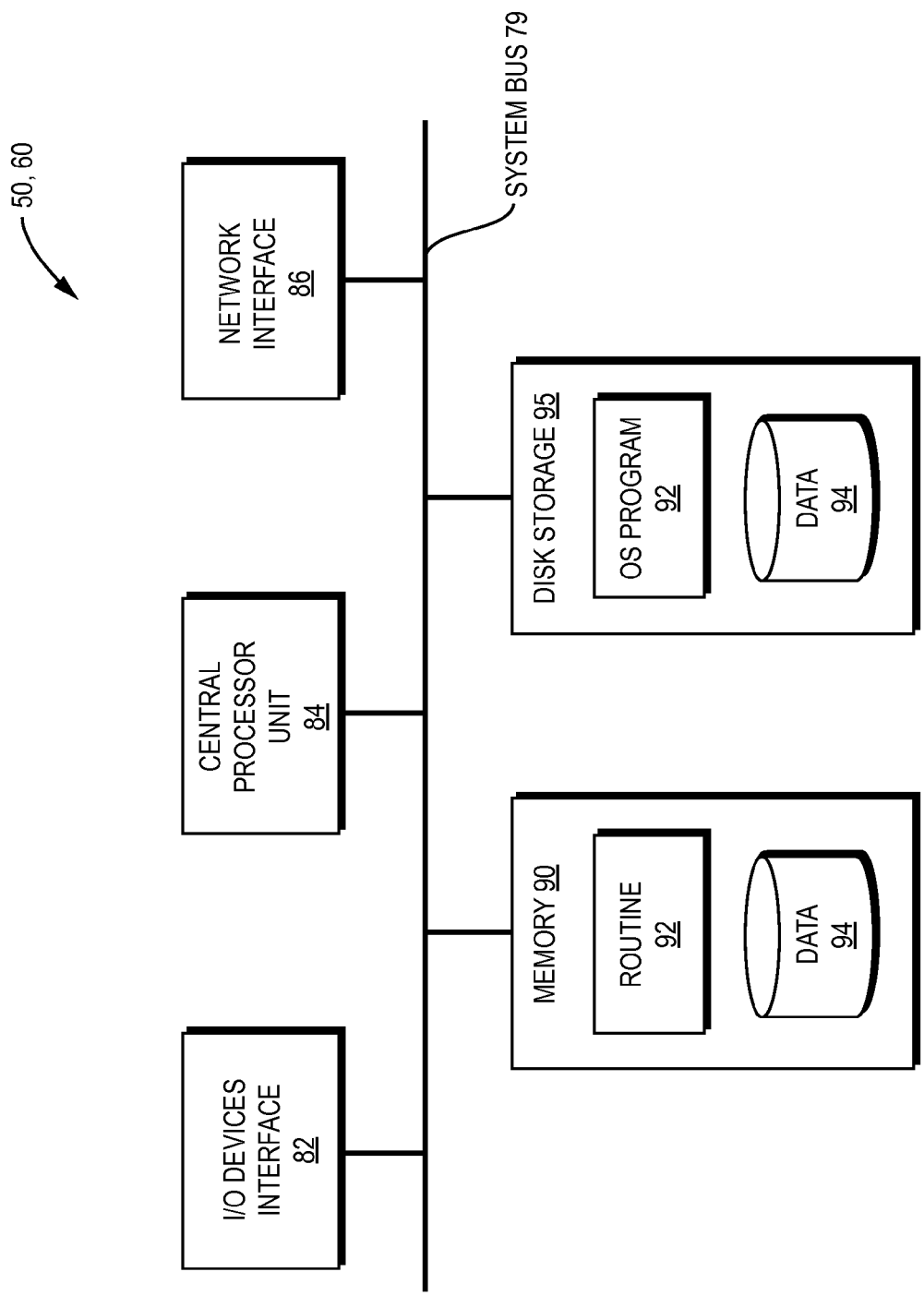
FIG. 2 is a block diagram of a computer node in the network of FIG. 1.

With reference now to FIGS. 1 and 2, example embodiments are illustrated and described.

FIG. 1 illustrates a computer network or similar digital processing environment in which the present invention may be implemented.

Client computer(s)/devices 50 and server computer(s) 60 provide processing, storage, and input/output devices executing application programs and the like. Client computer(s)/devices 50 can also be linked through communications network 70 to other computing devices, including other client devices/processes 50 and server computer(s) 60. Communications network 70 can be part of a remote access network, a global network (e.g., the Internet), a worldwide collection of computers, Local area or Wide area networks, and gateways that currently use respective protocols (TCP/IP, Bluetooth, etc.) to communicate with one another. Other electronic device/computer network architectures are suitable.

FIG. 2 is a diagram of the internal structure of a computer (e.g., client processor/device 50 or server computers 60) in the computer system of FIG. 1. Each computer 50, 60 contains system bus 79, where a bus is a set of hardware lines used for data transfer among the components of a computer or processing system. Bus 79 is essentially a shared conduit that connects different elements of a computer system (e.g., processor, disk storage, memory, input/output ports, network ports, etc.) that enables the transfer of information between the elements. Attached to system bus 79 is I/O device interface 82 for connecting various input and output devices (e.g., keyboard, mouse, displays, printers, speakers, etc.) to the computer 50, 60. Network interface 86 allows the computer to connect to various other devices attached to a network (e.g., network 70 of FIG. 1). Memory 90 provides volatile storage for computer software instructions 92 and data 94 used to implement an embodiment of the present invention (e.g., monitoring unit 13, attachment engine 19 and supporting code detailed below). Disk storage 95 provides non-volatile storage for computer software instructions 92 and data 94 used to implement an embodiment of the present invention. Central processor unit 84 is also attached to system bus 79 and provides for the execution of computer instructions.

In one embodiment, the processor routines 92 and data 94 are a computer program product (generally referenced 92), including a computer readable medium (e.g., a removable storage medium such as one or more DVD-ROM's, CD-ROM's, diskettes, tapes, etc.) that provides at least a portion of the software instructions for the invention system. Computer program product 92 can be installed by any suitable software installation procedure, as is well known in the art. In another embodiment, at least a portion of the software instructions may also be downloaded over a cable, communication and/or wireless connection. In other embodiments, the invention programs are a computer program propagated signal product 107 embodied on a propagated signal on a propagation medium (e.g., a radio wave, an infrared wave, a laser wave, a sound wave, or an electrical wave propagated over a global network such as the Internet, or other network(s)). Such carrier medium or signals provide at least a portion of the software instructions for the present invention routines/program 92.

In alternate embodiments, the propagated signal is an analog carrier wave or digital signal carried on the propagated medium. For example, the propagated signal may be a digitized signal propagated over a global network (e.g., the Internet), a telecommunications network, or other network. In one embodiment, the propagated signal is a signal that is transmitted over the propagation medium over a period of time, such as the instructions for a software application sent in packets over a network over a period of milliseconds, seconds, minutes, or longer. In another embodiment, the computer readable medium of computer program product 92 is a propagation medium that the computer system 50 may receive and read, such as by receiving the propagation medium and identifying a propagated signal embodied in the propagation medium, as described above for computer program propagated signal product.

Generally speaking, the term "carrier medium" or transient carrier encompasses the foregoing transient signals, propagated signals, propagated medium, storage medium and the like.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 3:
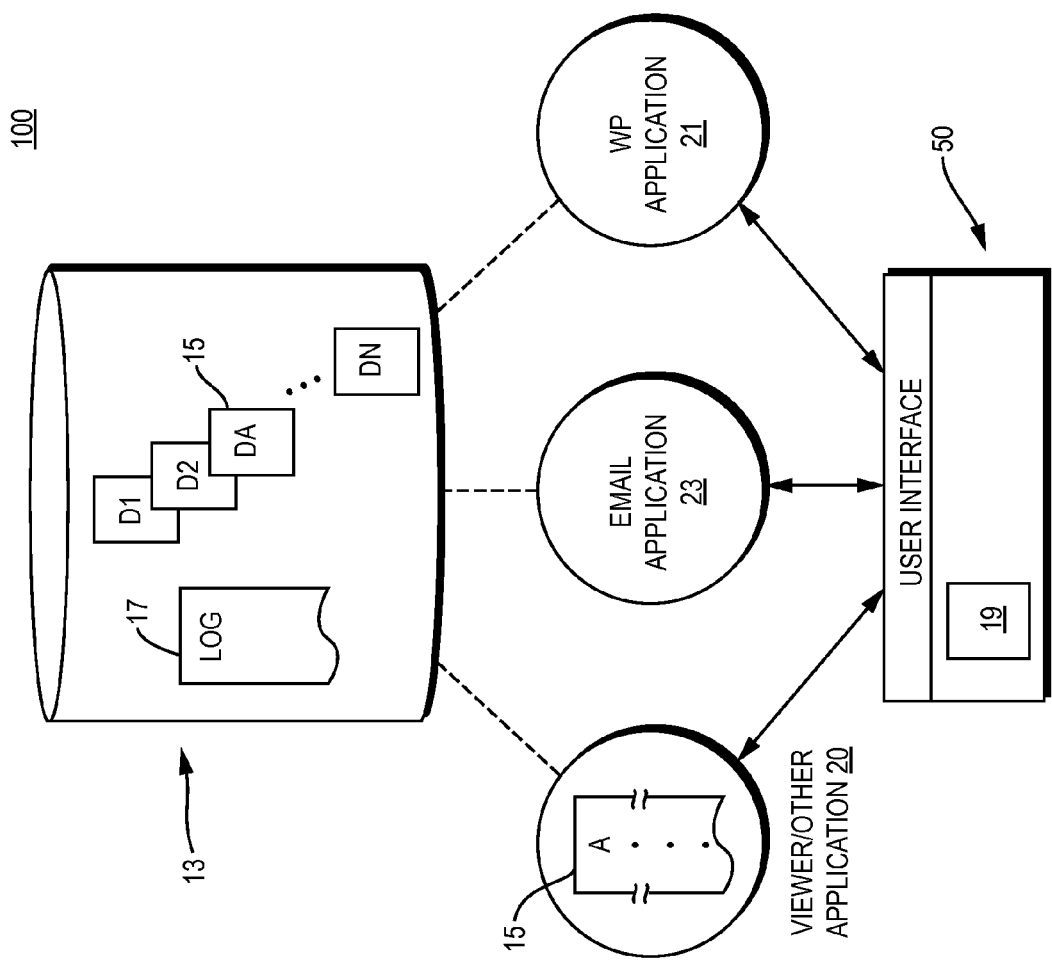
FIG. 3 is a schematic view of one embodiment of the present invention.

Referring now to FIG. 3, an email client or user computer 50 is operatively coupled to and executes various applications (20, 21, 23) such as an email application 23, a word processing application 21 and a viewer application 20 among others. The viewer application 20 under execution and operation of user computer 50 enables, for example, user-interactive viewing of a text document, images (PDF format, JPEG, etc.) and the like. User computer 50 executes word processing application 21 and enables user interaction with a document. User computer 50 executes email application 23 and enables user interaction with incoming and outgoing respective email messages and attachments, including linking to and viewing web pages and contents thereof and uploading documents, images and the like. The foregoing example subject items (word processed documents, text documents, images, web pages, HTML documents and other documents/pages) and the like of the various applications 20, 21, 23 are herein generally referred to as 'working documents' 15.

User computer 50 also executes or otherwise provides an embodiment 100 of the present invention. In one embodiment, a computer system, apparatus or the like machine 100 includes a monitoring unit 13 and an attachment engine 19. During user interaction with a working document 15 through a respective application 20, 21, 23, monitoring unit 13 monitors user viewing activity. In particular, monitoring unit 13 tracks user movement and control of a cursor (pointer) and/or page location indicator with respect to the working document 15. User movement and corresponding operation of the cursor/page location indicator may be by navigation operations and other user commands in various forms, i.e., menus, icons/buttons (e.g., forward/next and back/previous), scroll bars, user-interactive tools and the like.

In turn, monitoring unit 13 detects and determines when the user stops moving the cursor/page location indicator or momentarily pauses movement of the cursor/page location indicator for a threshold period of time. The threshold period of time may be in a range of 3 seconds to 5 seconds for instance. For example, when a user views a working document 15 (labeled 'A' in FIG. 3) on his computer 50, he may choose to view only a few pages. Embodiments of the present invention recognize that the user viewed for example five pages (say Pages 1, 2, 128, 129, 130). The invention system 100/monitoring unit 13 recognizes this because the user stopped scrolling for over a threshold Y seconds when the user got to these pages. Monitoring unit 13/invention system 100 interprets this pausing (stoppage of scrolling) on the subject page(s) to mean that the subject page(s) were substantially viewed, fully read and understood.

Upon detection of such cursor/locator movement stoppage or pausing for the threshold amount of time, monitoring unit 13 indicates this determination in a log 17. In one embodiment, monitoring unit 13 makes an entry in log 17 indicating working document 15 (e.g., by file name), location in the document (page or portion) and date/time of the detected user viewing activity (threshold interaction with the working document). The foregoing monitored viewing actions by the user are logged for each application 20, 21, 23 that the user uses and are stored in local log file 17 of user computer 50.

In other embodiments, a webcam or similar camera viewing is employed by monitoring unit 13 to automatically detect what the user has read (i.e., what portions of working documents 15 the user has spent a threshold Y amount of time on). Other devices or approaches based on time spent by the user with respect to working documents 15 (pages thereof) are suitable.

Subsequently (i.e., in a later given day or time period), the user chooses to email Document A (working document 15, FIG. 3) to someone through email application 23 for example. Or the user may attempt to upload Document A (working document 15) to a blog, wiki or forum for example. During composing of the email message or electronic communication to upload, attachment engine 19 is responsive to the user attempting to attach a copy of the working document 15. For the above example, attachment engine 19 issues a user interface communication (e.g., a pop-up) saying, for instance, "would you like to post only Pages 1, 2, 128, 129, 130 . . . . as these where the only pages you previously read from the document in the last 3 days". The user can then choose to simply send these few pages as the email attachment (or upload) instead of the entire working document 15. Not only does this enable saving on bandwidth, storage, mail server processing, etc. but it also saves the receiver (receiving user) from being confused and reading "non relevant" information.

Figure 4:
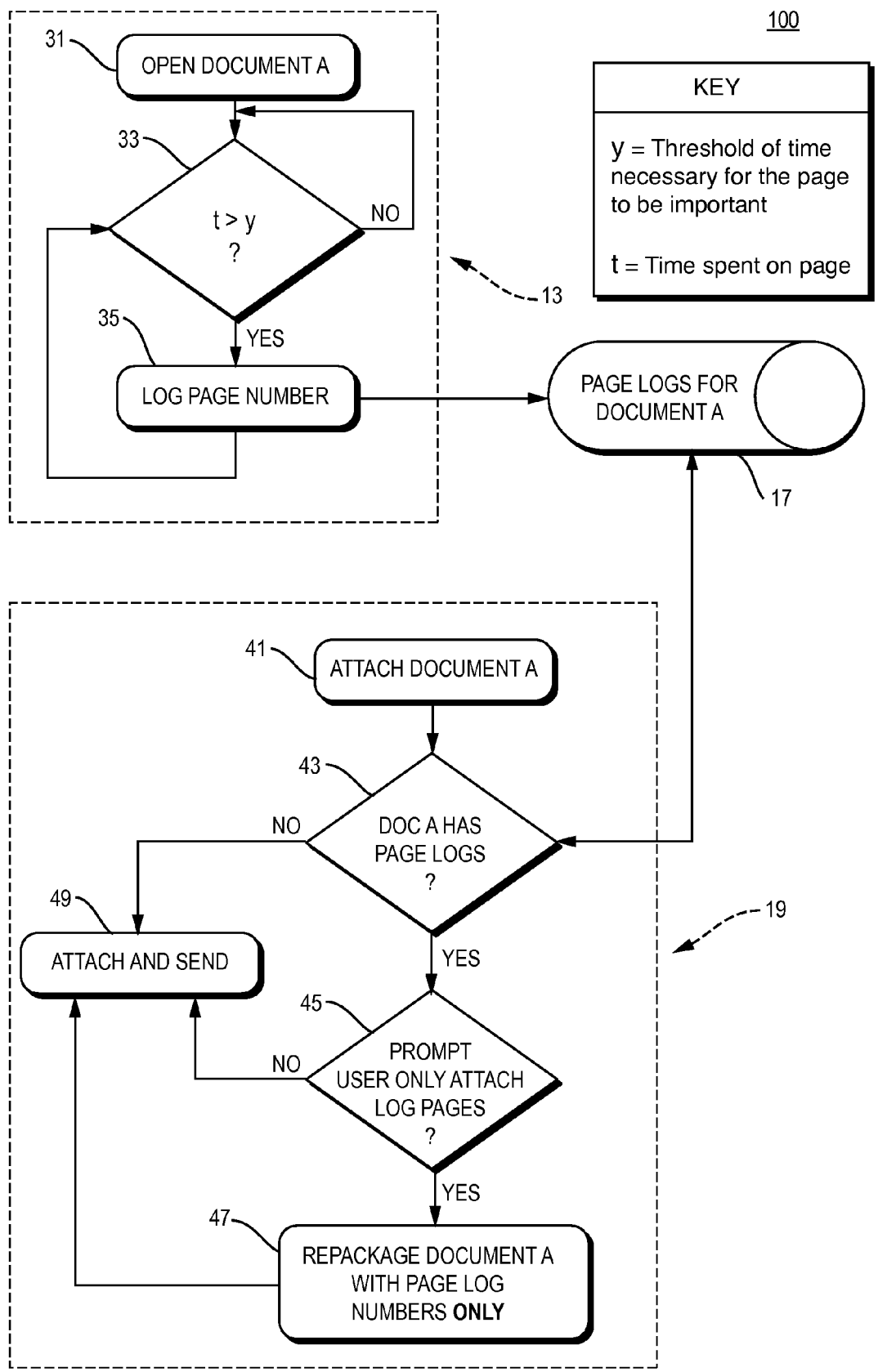
FIG. 4 is a flow diagram of the processes executed in the FIG. 3 embodiment.

FIG. 4 is a flow diagram of the processes executed by monitoring unit 13 and attachment engine 19 supporting the above described example embodiments. As part of monitoring unit 13 in one embodiment, an agent 31 runs in a background process to detect when a user opens a working document 15. Every time the user opens a working document 15, steps 33 and 35 register the use of the scroll bar (or other navigational tool/controller) and the page number of each page that the user spends over threshold Y seconds/minutes on. When the user closes the working document 15, the agent (step 35) writes this data to a log file at 17.

Subsequently when the user attempts to add a working document 15 as an attachment or upload the working document to a blog, wiki or forum, the attachment engine 19 responds (step 41). The attachment engine 19 (step 43) checks the log 17 to see if this working document 15 is in the log 17 and if so what pages of the subject document were previously read by the user (as earlier detected and logged by monitoring unit 13).

Step 45 prompts the user by displaying a message saying "would you like to add pages abc, as these are the only pages you read, or would you like to add the entire document" for example. If the user selects to add only the document pages previously read and indicated in the log 17, then step 47 repackages the document (i.e., generates a copy of only the pages of the subject document indicated in log 17). The repackaging step 47 also tags the beginning of the resulting shortened (abbreviated) copy of the working document 15 so that the receiving user is notified that this is not the full document version.

In turn, step 49 generates and transmits the resulting email message (or electronic communication upload) with attachment shortened, i.e., formed of a copy of only certain portions of the subject working document 15.

In step 43, if the subject working document is not found in log 17, then no shortened version of the document is offered as an option. And step 49 generates and transmits the email message (upload) with a copy of the full working document 15 as the attachment.

In step 45, if the user responds to the prompt by opting to use the full working document 15, then step 49 generates and transmits the email message (upload) with full working document 15 (all pages thereof) as the attachment.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

While this invention has been particularly shown and described with references to example embodiments thereof, it will be understood by those skilled in the art that various changes in form and details may be made therein without departing from the scope of the invention encompassed by the appended claims.

What is claimed is:

1. Computer method of reducing size of electronic communication attachments comprising: monitoring user viewing action relative to a working document within a computing device, wherein a monitoring unit is included within the computing device executing the working document and tracks user movement via at least one of control of a cursor and page location indicator with respect to the working document; wherein monitoring user viewing action monitors user action with respect to a threshold amount of time; logging in a log indications of monitored user viewing action per working document, including indicating in the log a file name of the working document and a reference to a certain portion of the working document that has been viewed by the user; and in response to the user composing an electronic communication, selecting the working document to be included in the electronic communication, determining that the working document is selected to be included in the electronic communication, presenting the user with a choice to only include the certain portion of the working document to serve as an attachment to the electronic communication in response to determining that the working document is selected to be included in the electronic communication, forming an attachment document by selecting the certain portion of the working document to serve as the attachment to the electronic communication, and by automatically providing, based on the log, copies of the indicated certain portion of the working document, the selecting and providing enabling the user to employ the indicated certain portion of the working document instead of the whole working document as the attachment document to the electronic communication, resulting in a reduced in size attachment and resulting in minimizing outgoing attachments to contain only amounts of information that have been viewed by the user.

2. A method as claimed in claim 1 wherein the electronic communication is an email message, and the reduced in size attachment is an email attachment that allows reduced email server processing.

3. A method as claimed in claim 1 wherein the user action is a pausing on the certain portion of the working document for the threshold amount of time, pausing being indicative of the user reading the certain portion of the working document.

4. A method as claimed in claim 1 wherein the certain portion is formed of one or more different segments of the working document.

5. A method as claimed in claim 1 wherein the electronic communication is an email message, and the reduced in size attachment is an email attachment that further enables reduced email server memory storage used to store email attachments.

6. A method as claimed in claim 1 wherein the working document is any of a word processed document, image, text document, web page, HTML document and other document.

7. A method as claimed in claim 1 further comprising providing to the user a choice of using the whole working document as the attachment instead of a certain portion.

8. A method as claimed in claim 1 wherein monitoring and logging is done in a background process free of the user defining the certain portion and free of the user making preselections about the certain portion for electronic communication.

9. A method as claimed in claim 1 wherein selecting the certain portion of the working document to serve as an attachment includes selecting the certain portion of the working document to upload to a blog, wiki or forum.

10. A method as claimed in claim 1 wherein monitoring includes utilizing a web cam or sensor view of user actions relative to the working document.

11. Computer apparatus for reducing size of electronic communication attachments comprising: a computer processor; a monitoring unit executable by and included within the computer processor and configured to monitor user viewing action relative to a working document, wherein the working document is within the computer processor executing the working document and tracks user movement via at least one of control of a cursor and page location indicator with respect to the working document, the monitoring unit configured to log into a log indications of monitored user viewing action per working document, including indicating in the log a file name of the working document and a reference to a certain portion of the working document that has been viewed by a user; wherein the monitoring unit monitors user action with respect to a threshold amount of time; and an attachment engine, executable by the computer processor, responsive to the user composing an electronic communication, configured to select the working document to be included in the electronic communication, determine that the working document is selected to be included in the electronic communication, present the user with a choice to only include the certain portion of the working document to serve as an attachment to the electronic communication in response to determining that the working document is selected to be included in the electronic communication, form an attachment document by selecting the certain portion of the working document to serve as the attachment to the electronic communication, and by automatically providing, based on the log, copies of the indicated certain portion of the working document, the attachment engine further configured to enable use of the indicated certain portion of the working document instead of the whole working document as the attachment document to the electronic communication, resulting in a reduced in size attachment and resulting in minimizing outgoing attachments to contain only amounts of information that have been viewed by the user.

12. Computer apparatus as claimed in claim 11 wherein the electronic communication is an email message, and the reduced in size attachment is an email attachment reduced in size that (a) allows reduced email server processing, and (b) enables reduced email server memory storage used to store email attachments.

13. Computer apparatus as claimed in claim 11 wherein the user action is a pausing on the certain portion of the working document for the threshold amount of time, pausing being indicative of the user reading the certain portion of the working document.

14. Computer apparatus as claimed in claim 11 wherein the certain portion is formed of one or more different segments of the working document.

15. Computer apparatus as claimed in claim 11 wherein the working document is any of a word processed document, image, text document, web page, HTML document and other document.

16. Computer apparatus as claimed in claim 11 wherein the attachment engine provides to the user a choice of using the whole working document as the attachment instead of the certain portion.

17. Computer apparatus as claimed in claim 11 wherein the monitoring unit monitors and logs in a background process free of the user defining the certain portion and free of the user otherwise making preselections about the certain portion for electronic communication.

18. Computer apparatus as claimed in claim 11 wherein the attachment engine selecting the certain portion of the working document to serve as an attachment includes selecting the certain portion of the working document to upload to a blog, wiki or forum.

19. Computer apparatus as claimed in claim 11 wherein the monitoring unit employs a web cam or sensor view of user action relative to the working document.

20. A computer program product for reducing size of electronic communication attachments, the computer program product comprising: a non-transitory computer readable storage medium having computer readable program code embedded therewith, the computer readable program code comprising: computer readable program code configured to monitor user viewing action relative to a working document within a computing device, wherein a monitoring unit is included within the computing device executing the working document and tracks user movement via at least one of control of a cursor and page location indicator with respect to the working document; wherein the monitoring unit monitors user action with respect to a threshold amount of time; computer readable program code configured to record in a log indications of monitored user viewing action per working document, including indicating in the log a file name of the working document and a reference to a certain portion of the working document that has been viewed by the user; and computer readable program code in response to the user composing an electronic communication, configured to select the working document to be included in the electronic communication, determine that the working document is selected to be included in the electronic communication, present the user with a choice to only include the certain portion of the working document to serve as an attachment to the electronic communication in response to determining that the working document is selected to be included in the electronic communication, form an attachment document by selecting the certain portion of the working document to serve as the attachment to the electronic communication, and by automatically providing, based on the log, copies of the indicated certain portion of the working document, the selecting and providing further configured to enable the user to employ the indicated certain portion of the working document instead of the whole working document as the attachment document to the electronic communication, resulting in a reduced in size attachment and resulting in minimizing outgoing attachments to contain only amounts of information that have been viewed by the user; wherein electronic communication is any of an email message, an upload to a blog, an upload to a wiki and an upload to a computer network forum.

* * * * *